United States Patent
Nozawa

(10) Patent No.: US 7,142,237 B2
(45) Date of Patent: Nov. 28, 2006

(54) IMAGING APPARATUS AND PROCESSING METHOD FOR CONVERTING THE NUMBER OF PIXELS OF AN INPUT IMAGE

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1082 days.

(21) Appl. No.: 09/874,253

(22) Filed: Jun. 6, 2001

(65) Prior Publication Data

US 2001/0055066 A1 Dec. 27, 2001

(30) Foreign Application Priority Data

Jun. 15, 2000 (JP) .............................. 2000-179720
Apr. 9, 2001 (JP) .............................. 2001-110114

(51) Int. Cl.
*H04N 5/262* (2006.01)
*H04N 5/228* (2006.01)
*H04N 5/222* (2006.01)
*H04N 7/01* (2006.01)
*G06K 1/00* (2006.01)
*G06K 9/32* (2006.01)

(52) U.S. Cl. ............................... 348/240.2; 348/222.1; 348/441; 348/333.11; 358/1.2; 382/298

(58) Field of Classification Search ...................... None
See application file for complete search history.

(56) References Cited

U.S. PATENT DOCUMENTS 4,963,981 A * 10/1990 Todaka et al. ........... 348/240.2
5,960,154 A * 9/1999 Ohnishi et al. .......... 348/240.99
5,966,171 A * 10/1999 Hieda ....................... 348/240.2
6,327,306 B1 * 12/2001 Sugiyama .............. 375/240.21
6,476,868 B1 * 11/2002 Kaji et al. ............. 348/333.12
6,707,467 B1 * 3/2004 Suga .......................... 382/300
6,741,280 B1 * 5/2004 Shioji .................... 348/240.99
6,801,250 B1 * 10/2004 Miyashita ................ 348/220.1
6,876,386 B1 * 4/2005 Ito ........................... 348/240.1
6,876,387 B1 * 4/2005 Lee .......................... 348/240.2
6,906,748 B1 * 6/2005 Kawase et al. ............. 382/299
2001/0013897 A1 * 8/2001 Kowno et al. .............. 348/240

* cited by examiner

Primary Examiner—David Ometz
Assistant Examiner—Nhan T. Tran
(74) Attorney, Agent, or Firm—Fitzpatrick, Cella, Harper & Scinto

(57) ABSTRACT

An imaging apparatus uses an imaging device to generate an image signal corresponding to an image having an arbitrary number of H pixels by W pixels which is not greater than a predetermined number of P pixels by Q pixels in vertical and horizontal directions. The apparatus converts the generated image signal into an image signal corresponding to an image having a predetermined number of P pixels by Q pixels. In the imaging apparatus, an enlarged image signal corresponding to an enlarged image having the number of P pixels by Q pixels is generated by performing enlargement processing on the image signal generated using the imaging device, and an image signal corresponding to an image having the number of M pixels by N pixels is generated by performing reduction processing on the generated enlarged image signal corresponding to the image having the P pixels by Q pixels.

17 Claims, 12 Drawing Sheets

IMAGING APPARATUS AND PROCESSING METHOD FOR CONVERTING THE NUMBER OF PIXELS OF AN INPUT IMAGE

BACKGROUND OF THE INVENTION

1. Field of the Invention

The present invention relates to imaging apparatuses, and in particular, to processing for converting the number of pixels of an input image signal.

2. Description of the Related Art

Conventionally, enlargement or reduction processing is known in which an image signal corresponding to a predetermined number of pixels is obtained by performing enlargement or reduction processing on an image signal corresponding to a certain resolution (certain number of pixels). Camcorders are one type of known apparatus that performs such enlargement or reduction processing.

In conventional camcorders, an image signal corresponding to a predetermined number of pixels which is defined by a format is acquired by an imaging device, and is recorded on a tape. Comcorders commonly have a function called "electronic zooming" in addition to normal optical zooming. In electronic zooming, the above enlargement processing is performed on part of an image signal from the imaging device.

In addition, recently, with the progress of semiconductor technology, a type of apparatus for recording high quality images has been proposed that employs an imaging device having a number of pixels which is much greater than the number of pixels defined by the format used in conventional comcorders and that generates an image signal corresponding to the number of pixels defined by the conventional format by performing reduction processing on the image signal from the imaging device. In this type of apparatus, while the zooming magnification is low (when optical zooming is being performed), an image signal output from the imaging device is processed for reduction, and is processed for enlargement by a higher magnification as the electronic zooming magnification increases. In this technique, in VCRs having an imaging device with a large number of pixels, the quality of images to be recorded can be enhanced.

However, although a type of camcorder having an imaging device with a large number of pixels can record high quality images, their circuit size is large because image processing must be performed for enlargement and reduction by arbitrary factors.

Even conventional camcorders also have a large circuit size when performing enlargement and reduction processing by arbitrary factors.

In any of these types of apparatuses, in order that high quality enlarged or reduced images may be obtained, coefficients of filters for use in enlargement and reduction processing must be variably set, and filters having a large number of taps must be used. This causes a much larger circuit size than that of a case of performing only one of enlargement processing and reduction processing, and is an obstacle to the development of inexpensive high-image-quality apparatuses.

SUMMARY OF THE INVENTION

Accordingly, it is an object of the present invention to solve the foregoing problems.

It is another object of the present invention to enable a change in the number of pixels on an input image without increasing the circuit size.

It is a further object of the present invention to perform high quality image processing without increasing the circuit size.

To these ends, according to an aspect of the present invention, the foregoing objects are achieved through provision of an imaging apparatus including an imaging unit for generating, by capturing an image of a subject, an image signal corresponding to an image having an arbitrary number of H pixels by W pixels which is not greater than a predetermined number of P pixels by Q pixels in vertical and horizontal directions, an enlarging unit for generating an enlarged image signal corresponding to an enlarged image having the number of P pixels by Q pixels by performing enlargement processing on the image signal generated by the imaging unit, and a reducing unit for generating a reduced image signal corresponding to a reduced image having a predetermined number of M pixels by N pixels by performing reduction processing on the enlarged image signal corresponding to the enlarged image having the number of P pixels by Q pixels.

According to another aspect of the present invention, the foregoing object is achieved through provision of an imaging apparatus including an imaging unit for generating an image signal corresponding to an arbitrary size equal to or smaller than a first predetermined size, the generated image signal being converted into an image signal corresponding to a second predetermined size by the imaging apparatus, an enlarging unit for performing enlargement processing on the image signal generated by the imaging unit so that an image signal corresponding to the first predetermined size is generated, and a reducing unit for performing reduction processing on the image signal generated by the enlarging unit so that an image signal corresponding to the second predetermined size is generated.

According to another aspect of the present invention, the foregoing objects are achieved through provision of an imaging apparatus including an imaging unit having an electronic zoom function, an enlarging unit for performing enlargement processing on an image signal generated by the imaging unit by using a variable magnification in accordance with a magnification used in the electronic zoom function, and a reducing unit for performing reduction processing on the image signal processed by the enlarging unit by using a fixed factor.

According to another aspect of the present invention, the foregoing objects are achieved through provision of an imaging apparatus including an imaging unit for generating, by capturing an image of a subject, an image signal corresponding to an image having an arbitrary number of H pixels by W pixels which is not greater than a predetermined number of P pixels by Q pixels in vertical and horizontal directions, an enlarging unit for generating an enlarged image signal corresponding to an enlarged image having the number of P pixels by Q pixels by performing enlargement processing on the image signal generated by the imaging unit, a reducing unit for generating a reduced image signal corresponding to a reduced image having a predetermined number of M pixels by N pixels by performing reduction processing on the enlarged image signal corresponding to the enlarged image having the number of P pixels by Q pixels, a mode-setting unit for selectively setting one of a moving picture recording mode in which the reduced image signal is recorded as a moving picture on a first recording medium and a still picture recording mode in which a portion of the enlarged image signal which corresponds to one frame is recorded as a still picture on a second recording medium, and a display unit for an image corresponding to the reduced image signal from the reducing unit irrespective of one of the modes which is set by the mode-setting unit.

According to another aspect of the present invention, the foregoing objects are achieved through provision of an imaging apparatus including an imaging unit for generating, by capturing an image of a subject, an image signal corresponding to an image having an arbitrary number of H pixels by W pixels which is not greater than a predetermined number of P pixels by Q pixels in vertical and horizontal directions, an enlarging unit for generating an enlarged image signal corresponding to an enlarged image having the number of P pixels by Q pixels by performing cubic convolutional interpolation processing on the image signal generated by the imaging unit, and a reducing unit for generating a reduced image signal corresponding to a reduced image having a predetermined number of M pixels by N pixels by performing finite-impulse-response filtering on the enlarged image signal corresponding to the enlarged image having the number of P pixels by Q pixels.

According to another aspect of the present invention, the foregoing objects are achieved through provision of an imaging apparatus including an imaging unit for generating, by capturing an image of a subject, an image signal corresponding to an image having an arbitrary number of H pixels by W pixels which is not greater than a predetermined number of P pixels by Q pixels in vertical and horizontal directions, an enlarging unit for generating an enlarged image signal by performing linear-interpolation processing on the image signal generated by the imaging unit, and a reducing unit for generating a reduced image signal corresponding to a reduced image having a predetermined number of M pixels by N pixels by performing finite-impulse-response filtering on the enlarged image signal corresponding to the enlarged image having the number of P pixels by Q pixels.

According to another aspect of the present invention, the foregoing objects are achieved through provision of an image processing apparatus including an input unit for inputting an image signal corresponding to an image having an arbitrary number of H pixels by W pixels which is not greater than a predetermined number of P pixels by Q pixels in vertical and horizontal directions, an enlarging unit for generating an enlarged image signal corresponding to an enlarged image having the number of P pixels by Q pixels by performing enlargement processing on the image signal generated by the imaging unit, and a reducing unit for generating a reduced image signal corresponding to a reduced image having a predetermined number of M pixels by N pixels by performing reduction processing on the enlarged image signal corresponding to the enlarged image having the number of P pixels by Q pixels.

According to another aspect of the present invention, the foregoing objects are achieved through provision of an image processing apparatus including an input unit for inputting an interlaced image signal corresponding to an interlaced image including an arbitrary number of H pixels which is less than a predetermined number of P pixels in the vertical direction of one field, an enlarging unit for generating a progressive image signal corresponding to a progressive image including the P pixels in the vertical direction by performing enlargement processing on the input interlaced image signal in units of fields, and a reducing unit for generating an interlaced image including a predetermined number of M pixels in the vertical direction by performing reduction processing on the progressive image signal in units of frames.

According to another aspect of the present invention, the foregoing objects are achieved through provision of an image processing apparatus for outputting an image signal corresponding to an image having a predetermined number of M pixels by N pixels by performing reduction processing on an image signal corresponding to an image having an arbitrary number of H pixels by W pixels which is less than a predetermined number of P pixels by Q pixels in vertical and horizontal directions. The image processing apparatus includes an input unit for inputting the image signal corresponding to the image having the number of H pixels by W pixels, a first enlarging unit for generating an image signal corresponding to an image having a predetermined number of H pixels by Q pixels by performing enlargement processing on the input image signal, a first reducing unit for generating an image signal corresponding to an image having a predetermined number of H pixels by N pixels by performing horizontal reduction processing on the generated image signal corresponding to the image having the number of H pixels by Q pixels, a second enlarging unit for generating an image signal having a predetermined number of P pixels by N pixels by performing vertical enlargement processing on the generated image signal corresponding to the image having the number of H pixels by N pixels, and a second reducing unit for generating an image signal corresponding to an image having the number of M pixels by N pixels by performing vertical reduction processing on the obtained image signal corresponding to the image having the number of P pixels by N pixels.

According to another aspect of the present invention, the foregoing objects are achieved through provision of a method for generating an image signal corresponding to an image having a predetermined number of M pixels by N pixels by converting an input image signal corresponding to an image having an arbitrary number of H pixels by W pixels which is less than a predetermined number of P pixels by Q pixels in vertical and horizontal directions. The method includes the steps of generating an enlarged image signal corresponding to an enlarged image having the number of P pixels by Q pixels by performing enlargement processing on the input image signal, and generating the image signal corresponding to the image having the number of M pixels by N pixels by performing reduction processing on the generated enlarged image signal corresponding to the image having the number of P pixels by Q pixels.

According to another aspect of the present invention, the foregoing objects are achieved through provision of a method for generating an image signal corresponding to an image having a predetermined number of M pixels by N pixels by converting an input image signal corresponding to an image having an arbitrary number of H pixels by W pixels which is less than a predetermined number of P pixels by Q pixels in vertical and horizontal directions. The method includes a first enlarging step for generating an image signal corresponding to an image having a number of H pixels by Q pixels by performing horizontal enlargement processing on the input image signal, a first reducing step for generating an image signal corresponding to an image having a number of H pixels by N pixels by performing horizontal reduction processing on the generated image signal corresponding to the image having the number of H pixels by Q pixels, a second enlarging step for generating an image signal corresponding to an image having a number of P pixels by N pixels by performing vertical enlargement processing on the generated image signal corresponding to the image having the number of H pixels by N pixels, and a second reducing step for generating an image signal corresponding to an image having a number of M pixels by N pixels by performing vertical reduction processing on the generated image signal corresponding to the image having the number of P pixels by N pixels.

According to another aspect of the present invention, the foregoing objects are achieved through provision of a method for converting an input image signal from an imaging device which corresponds to an arbitrary image size equal to or less than a first predetermined image size into an image signal corresponding to a second image size. The method includes the steps of generating an enlarged image signal corresponding to an enlarged image having the first predetermined image size by performing enlargement processing on the input image signal corresponding to the arbitrary image size, and performing reduction processing on the generated image signal so that the image signal corresponding to the second image size is generated.

According to another aspect of the present invention, the foregoing objects are achieved through provision of a method for generating an interlaced image signal corresponding to an interlaced image having a predetermined number of M pixels in the vertical direction by converting an input interlaced image signal corresponding to an interlaced image having an arbitrary number of H pixels which is not greater than a predetermined number of P pixels in the vertical direction of one field. The method includes an enlarging step for generating a progressive image signal corresponding to a progressive image having the number of P pixels in the vertical direction by performing enlargement processing on the input interlaced image signal in units of fields, and a reducing step for generating an interlaced image signal corresponding to an interlaced image having the number of M pixels by performing reduction processing on the generated progressive image signal in units of frames.

According to another aspect of the present invention, the foregoing objects are achieved through provision of a storage medium storing a program for controlling a computer to execute a process for generating an image signal corresponding to an image having a predetermined number of M pixels by N pixels by converting an input image signal corresponding to an image having a predetermined number of H pixels by W pixels which is not greater than a predetermined number of P pixels by Q pixels in vertical and horizontal directions. The process includes the steps of generating an enlarged image signal corresponding to an enlarged image having the number of P pixels by Q pixels by performing enlargement processing on the input image signal, and generating the image signal corresponding to the image having the number of M pixels by N pixels by performing reduction processing on the generated enlarged image signal corresponding to the image having the number of P pixels by Q pixels.

According to another aspect of the present invention, the foregoing objects are achieved through provision of a storage medium storing a program for controlling a computer to execute a process for generating an image signal corresponding to an image having a predetermined number of M pixels by N pixels by converting an input image signal corresponding to an image having an arbitrary number of H pixels by W pixels which is less than a predetermined number of P pixels by Q pixels in vertical and horizontal directions. The process includes a first enlarging step for generating an image signal corresponding to an image having a number of H pixels by Q pixels by performing horizontal enlargement processing on the input image signal, a first reducing step for generating an image signal corresponding to an image having a number of H pixels by N pixels by performing horizontal reduction processing on the generated image signal corresponding to the image having the number of H pixels by Q pixels, a second enlarging step for generating an image signal corresponding to an image having a number of P pixels by N pixels by performing vertical enlargement processing on the generated image signal corresponding to the image having the number of H pixels by N pixels, and a second reducing step for generating an image signal corresponding to an image having a number of M pixels by N pixels by performing vertical reduction processing on the generated image signal corresponding to the image having the number of P pixels by N pixels.

According to another aspect of the present invention, the foregoing objects are achieved through provision of a storage medium storing a program for controlling a computer to execute a process for converting an input image signal from an imaging device which corresponds to an arbitrary image size equal to or less than a first predetermined image size into an image signal corresponding to a second image size. The process includes the steps of generating an enlarged image signal corresponding to an enlarged image having the first predetermined image size by performing enlargement processing on the input image signal corresponding to the arbitrary image size, and performing reduction processing on the generated image signal so that the image signal corresponding to the second image size is generated.

According to another aspect of the present invention, the foregoing objects are achieved through provision of a storage medium storing a program for controlling a computer to execute a process for generating an interlaced image signal corresponding to an interlaced image having a predetermined number of M pixels in the vertical direction by converting an input interlaced image signal corresponding to an interlaced image having an arbitrary number of H pixels which is not greater than a predetermined number of P pixels in the vertical direction of one field. The process includes an enlarging step for generating a progressive image signal corresponding to a progressive image having the number of P pixels in the vertical direction by performing enlargement processing on the input interlaced image signal in units of fields, and a reducing step for generating an interlaced image signal corresponding to an interlaced image having the number of M pixels by performing reduction processing on the generated progressive image signal in units of frames.

Further objects, features and advantages of the present invention will become apparent from the following description of the preferred embodiments with reference to the attached drawings

DESCRIPTION OF THE PREFERRED EMBODIMENTS

Embodiments of the present invention are described below with reference to the accompanying drawings.

Figure 1:
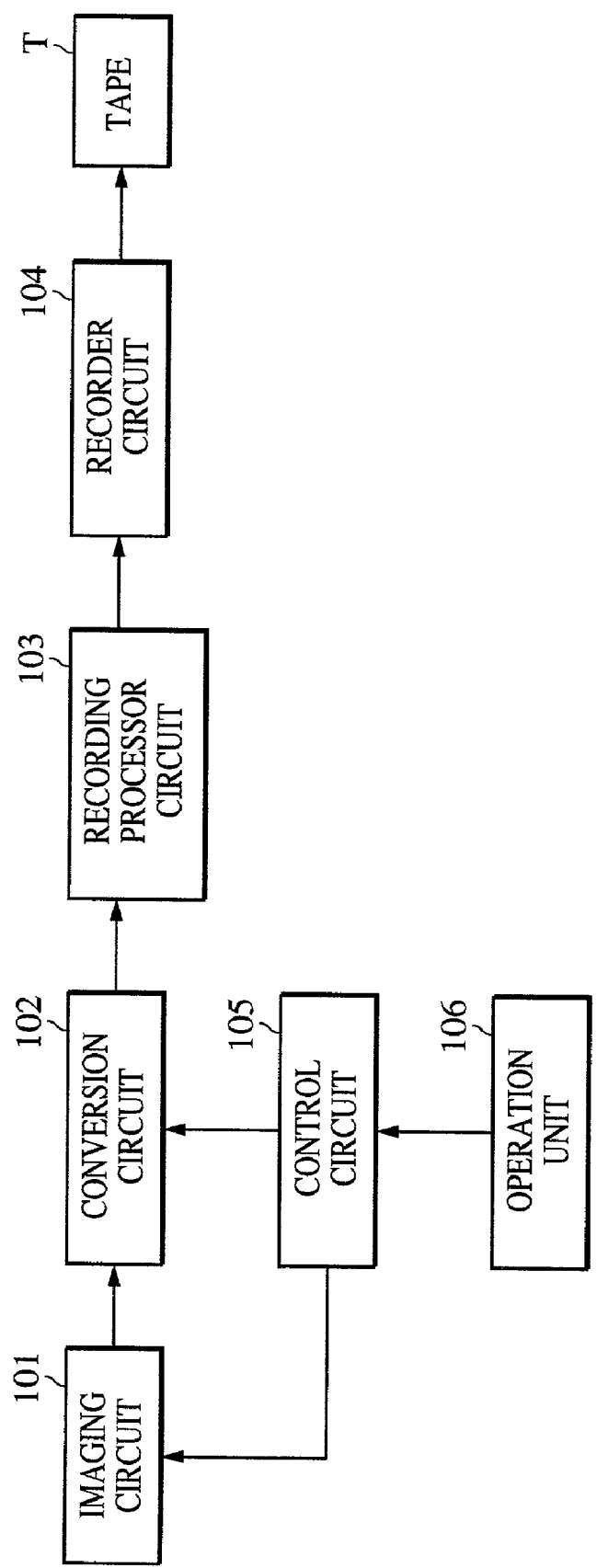
FIG. 1 is a block diagram showing a camcorder according to a first embodiment of the present invention.

FIG. 1 is a block diagram showing a camcorder according to a first embodiment of the present invention.

In FIG. 1, an image signal obtained by an imaging circuit 101 is output to a conversion circuit 102. The conversion circuit 102 generates an image signal having a predetermined number of pixels by performing enlargement or reduction processing on the image signal from the imaging circuit 101. The generated image signal is output to a recording processor circuit 103. The recording processor circuit 103 uses known high efficient encoding to compress and encode the image signal from the conversion circuit 102. The compressed and encoded image signal is output to a recorder circuit 104. By processing the compressed and encoded image signal in accordance with a recording format, the recorder circuit 104 converts the compressed and encoded image signal to a form adapted for recording on a tape T.

An operation unit 106 has recording, termination, main power, and zoom switches. The user of the camcorder uses these switches to issue instructions. In accordance with a zoom instruction from the operation unit 106, a control circuit 105 outputs, to the imaging circuit 101, a control signal for instructing a zoom magnification, and outputs, to the conversion circuit 102, a control signal for instructing an enlarging magnification.

Figure 2A:
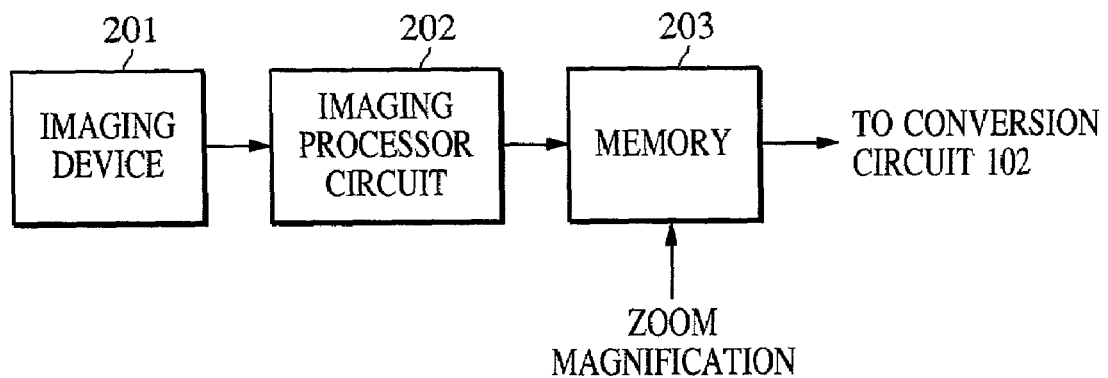
FIGS. 2A and 2B are block diagrams showing an imaging circuit shown in FIG. 1.

FIG. 2A shows a configuration of the imaging circuit 101 shown in FIG. 1.

In FIG. 2A, an imaging device 201 includes a CCD and a driver circuit therefor, and converts an optical image from a subject into an electric image signal. The electric signal is output to an imaging processor circuit 202. The imaging processor circuit 202 processes the image signal by using known camera-signal processes such as white balance control and gamma conversion, and outputs the processed signal to a memory 203. The memory 203 can store an image signal corresponding to a number of vertical P pixels by horizontal Q pixels which is the number of pixels of the imaging device 201. The memory 203 controls a reading address in accordance with an electronic zoom magnification, and reads a portion of the stored image signal. The read portion is output to the conversion circuit 102.

Figure 2B:
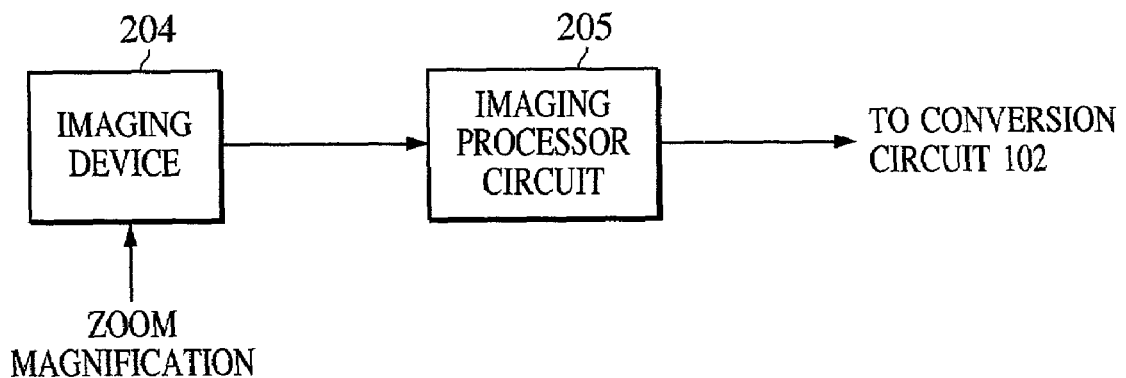

FIG. 2B shows another configuration of the imaging circuit 101 shown in FIG. 1.

In FIG. 2B, an imaging device 204 includes a CCD and a driver circuit therefor, and converts an optical image of the subject into an electric image signal. The image signal is output to an imaging processor circuit 205. The imaging processor circuit 205 processes the image signal by using known camera-signal processes such as white balance control and gamma conversion, and outputs the processed signal to the conversion circuit 102. The configuration in FIG. 2B does not include the memory 203 in FIG. 2A. In accordance with a zoom magnification from the control circuit 105, the imaging device 204 determines a range for reading charges from the CCD, that is, an image-signal size. In the imaging device 204, charges from part of the range for reading charges are read and output as an image signal.

In the embodiments which are described below, the configuration in FIG. 2A is used as the imaging circuit 101.

Next, the conversion circuit 102 is described below.

Figure 3:
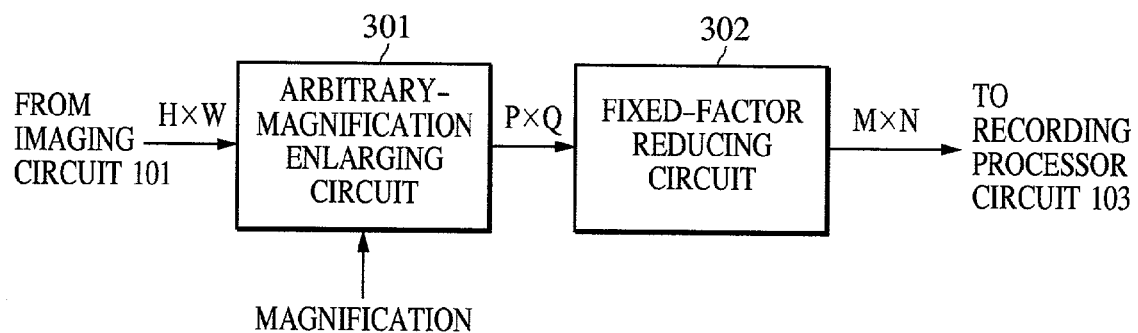
FIG. 3 is a block diagram showing a conversion circuit shown in FIG. 1.

FIG. 3 shows the structure of the conversion circuit 102 in the camcorder shown in FIG. 1.

The image signal read from the memory 203 in the imaging circuit 101 is output to an arbitrary-magnification enlarging circuit 301. The image signal has an arbitrary number of H pixels by W pixels which is less than a total number of P pixels by Q pixels in the imaging device 201 or 204. The arbitrary-magnification enlarging circuit 301 performs enlargement processing on the image signal having the number of H pixels by W pixels by a magnification in accordance with the control signal from the control circuit 105. The enlargement-processed image signal is output to a fixed-factor reducing circuit 302.

By performing reduction processing on the enlargement-processed image signal from the arbitrary-magnification enlarging circuit 301, the fixed-factor reducing circuit 302 generates an image signal corresponding to a predetermined number of M pixels by N pixels which is defined in a digital video format as employed in the camcorder according to the first embodiment.

Figure 4:
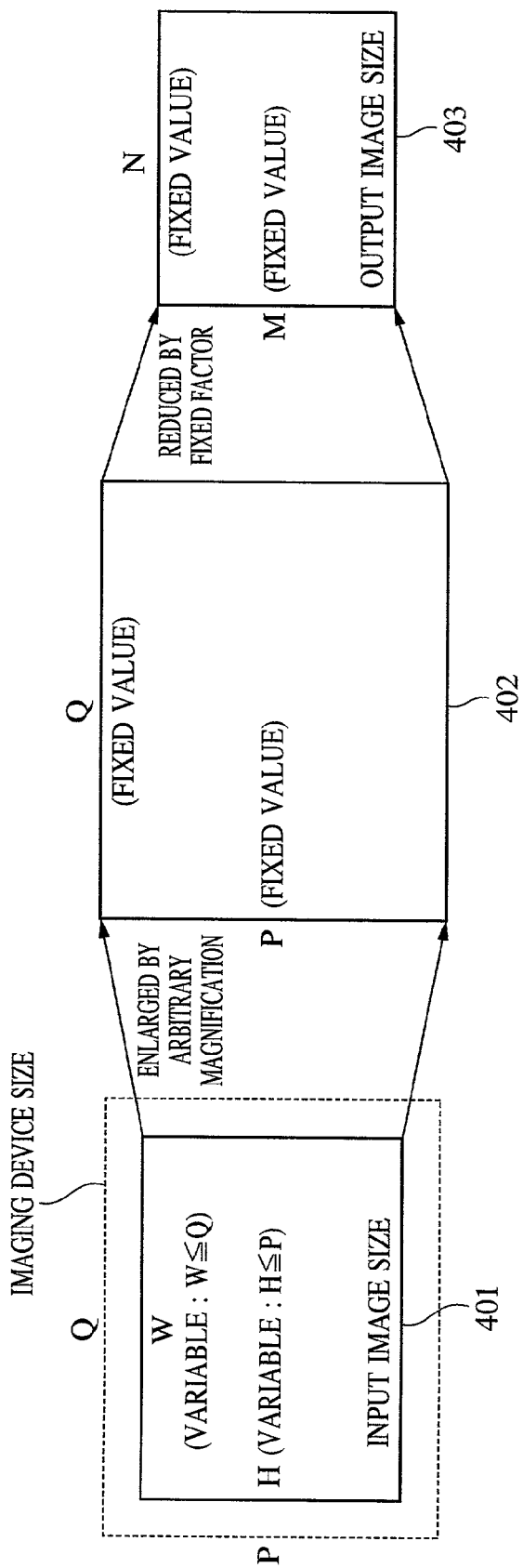
FIG. 4 is an illustration of image-size conversion processing according to one embodiment of the present invention.

FIG. 4 shows image-size conversion processing performed by the conversion circuit 102 shown in FIG. 3.

Referring to FIG. 4, by performing enlargement processing on an input image signal 401 corresponding to a variable number of H pixels by W pixels which is set by electronic zooming magnification, the arbitrary-magnification enlarging circuit 301 generates an image signal 402 corresponding to a predetermined number of P pixels by Q pixels. The horizontal enlargement factor of Q/W and the vertical enlargement factor of P/H are calculated in accordance with the electronic zooming magnification from the control circuit 105, that is, image-signal size and the predetermined number of P pixels by Q pixels which are read from the memory 203. The calculated factors are output to the arbitrary-magnification enlarging circuit 301.

The fixed-factor reducing circuit 302 generates an image signal 403 corresponding to a predetermined number of M pixels by N pixels by using a fixed factor to perform reduction processing on the enlargement-processed image signal 402.

Figure 5:
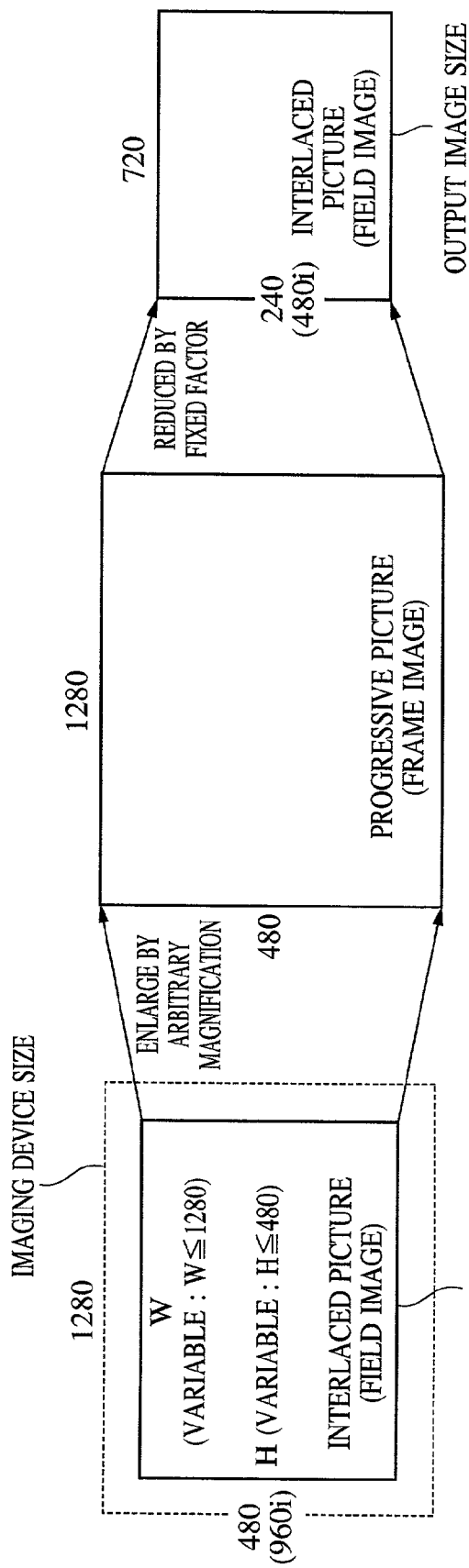
FIG. 5 is an illustration of image-size converting processing according to another embodiment of the present invention.

By way of example, it is assumed that a tetragonal lattice CCD having a size of 480 pixels by 1280 pixels as shown in FIG. 5 is used as each of the imaging devices 201 and 204 in FIGS. 2A and 2B. When an image signal corresponding to a variable number of H pixels by W pixels (where $H \leq 480$ and $W \leq 1280$), which is obtained by this imaging device, is enlargement-processed to generate an image signal corresponding to a fixed number of 480 pixels by 1280 pixels, and the 480-by-1280-pixel image signal is further converted into an image signal corresponding to a fixed number of 240 by 720 pixels, the arbitrary magnification enlarging circuit 301 performs enlargement processing by a vertical factor of 480/H and a horizontal factor of 1280/W.

As for this type of enlargement processing, there are methods that are realized by relatively small circuit size, such as linear interpolation and cubic convolutional interpolation. In this embodiment, these methods are used to perform enlargement processing.

The fixed-factor reducing circuit 302 performs reduction processing by using fixed vertical and horizontal factors (a vertical factor of 240/480 and a horizontal factor of 720/1280). In the fixed-factor reducing circuit 302, filter processing by a finite impulse response (FIR) filter is used to perform reduction processing. In this embodiment, by limiting the reduction processing to reduction using fixed factors, the reduction processing can be performed in very small circuit size. In addition, as shown in FIG. 5, when a frame image (progressive image) obtained by the imaging device 201 is converted into a field image (interlaced image), the reduction can be performed by using a simplified decimating FIR filter to perform vertical processing. Accordingly, the circuit size can be formed to be extremely small.

As described above, according to the first embodiment, when an input image signal corresponding to a variable image 10, size is processed for enlargement or reduction, by once converting the input signal into an image signal corresponding to a predetermined image size by arbitrary-magnification enlargement processing, and subsequently converting the image signal to obtain the desired image size by fixed-factor reduction processing, enlargement in circuit size by performing arbitrary-factor reduction processing is prevented. Therefore, an enlarged or reduced high-definition image can be obtained without enlarging the circuit size.

In the first embodiment, although the conversion circuit 102 performs fixed-factor reduction processing after performing enlargement processing on an input image signal by arbitrary vertical and horizontal magnifications, enlargement processing by arbitrary vertical and horizontal magnifications, and fixed-factor reduction processing may be separately performed.

Figure 6:
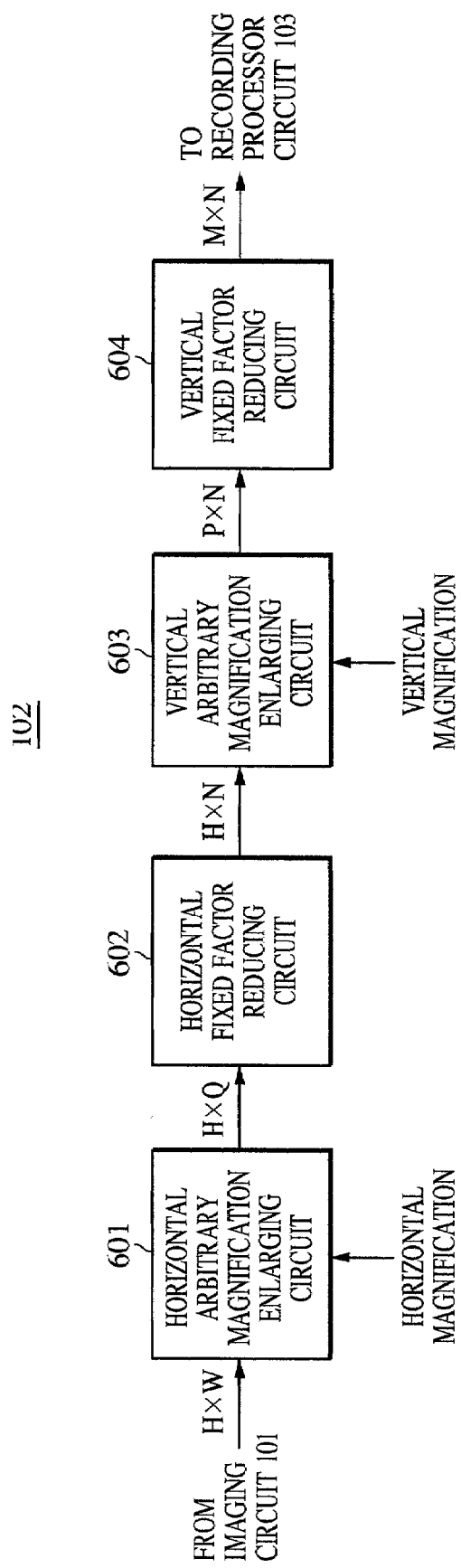
FIG. 6 is a block diagram showing a conversion circuit shown in FIG. 1.
Figure 7:
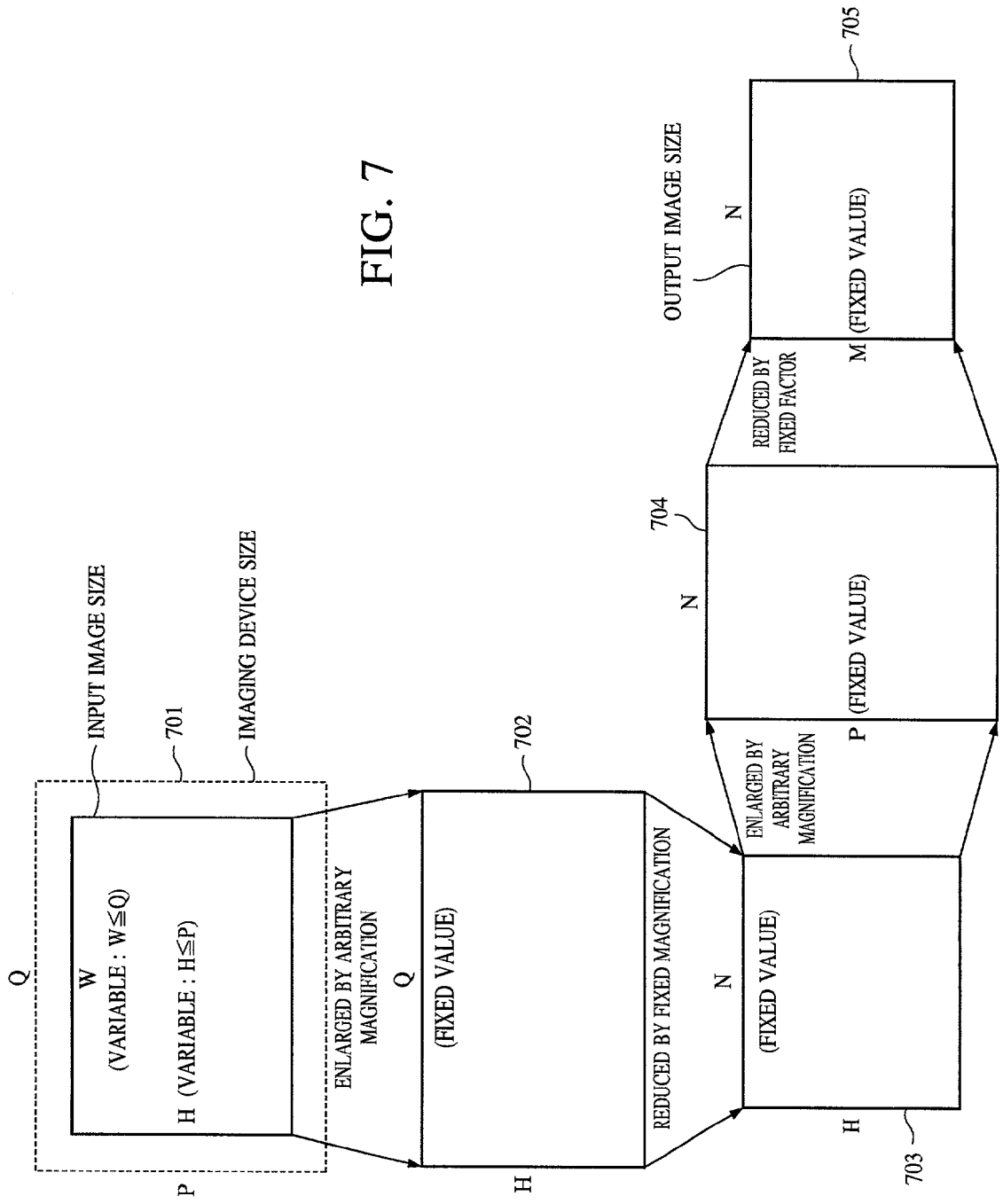
FIG. 7 is an illustration of processing by the block diagram shown in FIG. 6.

FIG. 6 is another block diagram showing the conversion circuit 102, and FIG. 7 is an illustration of processing performed by the block diagram shown in FIG. 6.

In FIG. 6, an image signal corresponding to an image size (701 in FIG. 7) of H pixels by W pixels is input to a horizontal arbitrary magnification enlarging circuit 601. The horizontal arbitrary magnification enlarging circuit 601 increases the number of horizontal pixels of the input image signal from W pixels to Q pixels in accordance with the magnification output from the control circuit 105, and outputs the resultant image signal corresponding to a size 702 of H pixels by Q pixels to a horizontal fixed factor reducing circuit 602. The horizontal fixed factor reducing circuit 602 reduces the horizontal number of pixels of the horizontal-enlargement-processed image signal (corresponding to the size 702 of H pixels by Q pixels) from Q pixels to predetermined N pixels, and outputs the resultant image signal corresponding to a size 703 of H pixels by N pixels to a vertical arbitrary magnification enlarging circuit 603.

The vertical arbitrary magnification enlarging circuit 603 increases, in accordance with the magnification output from the control circuit 105, the number of pixels of the image signal (corresponding to the size 703) output from the horizontal fixed factor reducing circuit 602 from H pixels to P pixels, and outputs the resultant signal corresponding to a size 704 of P pixels by N pixels to a vertical fixed factor reducing circuit 604. The vertical fixed factor reducing circuit 604 reduces the vertical number of pixels of the vertical-enlargement-processed image signal (corresponding to the size 704 of P pixels by N pixels) from P pixels to predetermined M pixels, and outputs the resultant image signal corresponding to a size 705 of M pixels by N pixels to the recording processor circuit 103.

Also in FIG. 6, the horizontal arbitrary magnification enlarging circuit 601 or the vertical arbitrary magnification enlarging circuit 603 can use linear interpolation and cubic convolutional interpolation.

Figure 8:
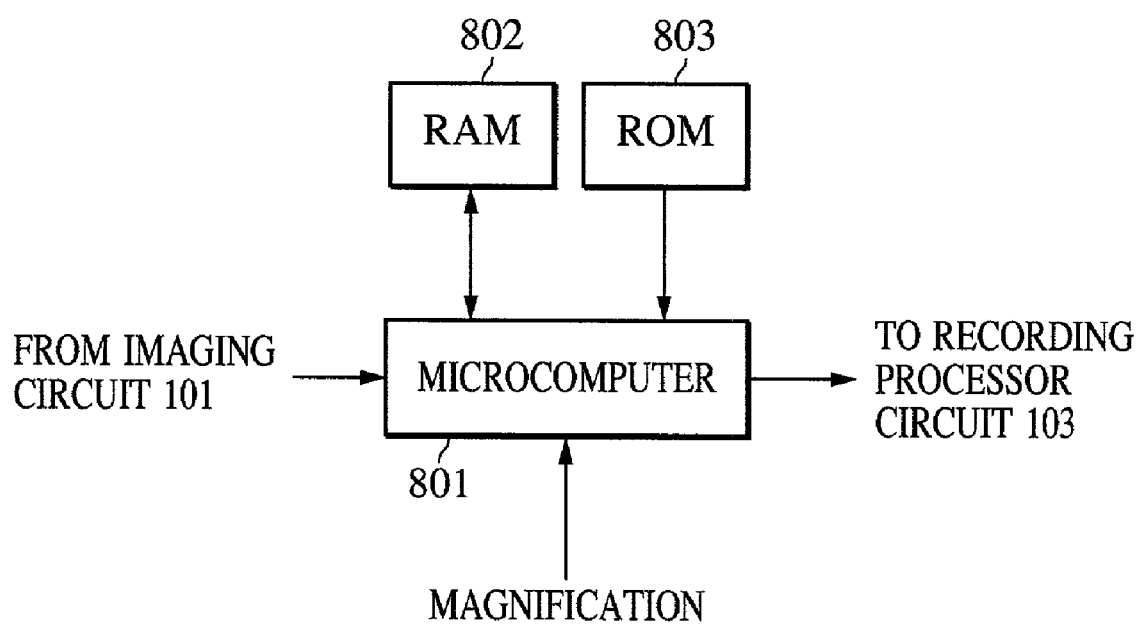
FIG. 8 is a block diagram showing the conversion circuit shown in FIG. 1.

In the first embodiment, the conversion circuit 102 is formed by a circuit as shown in FIG. 3 or 6. However, the conversion circuit 102 may be realized by software processing, such as that shown in FIG. 8, by a microcomputer 801, a random access memory (RAM) 802, and a read-only memory (ROM) 803. In this case, also the ROM 803, which stores a program for the processing, forms the present invention.

Figure 9:
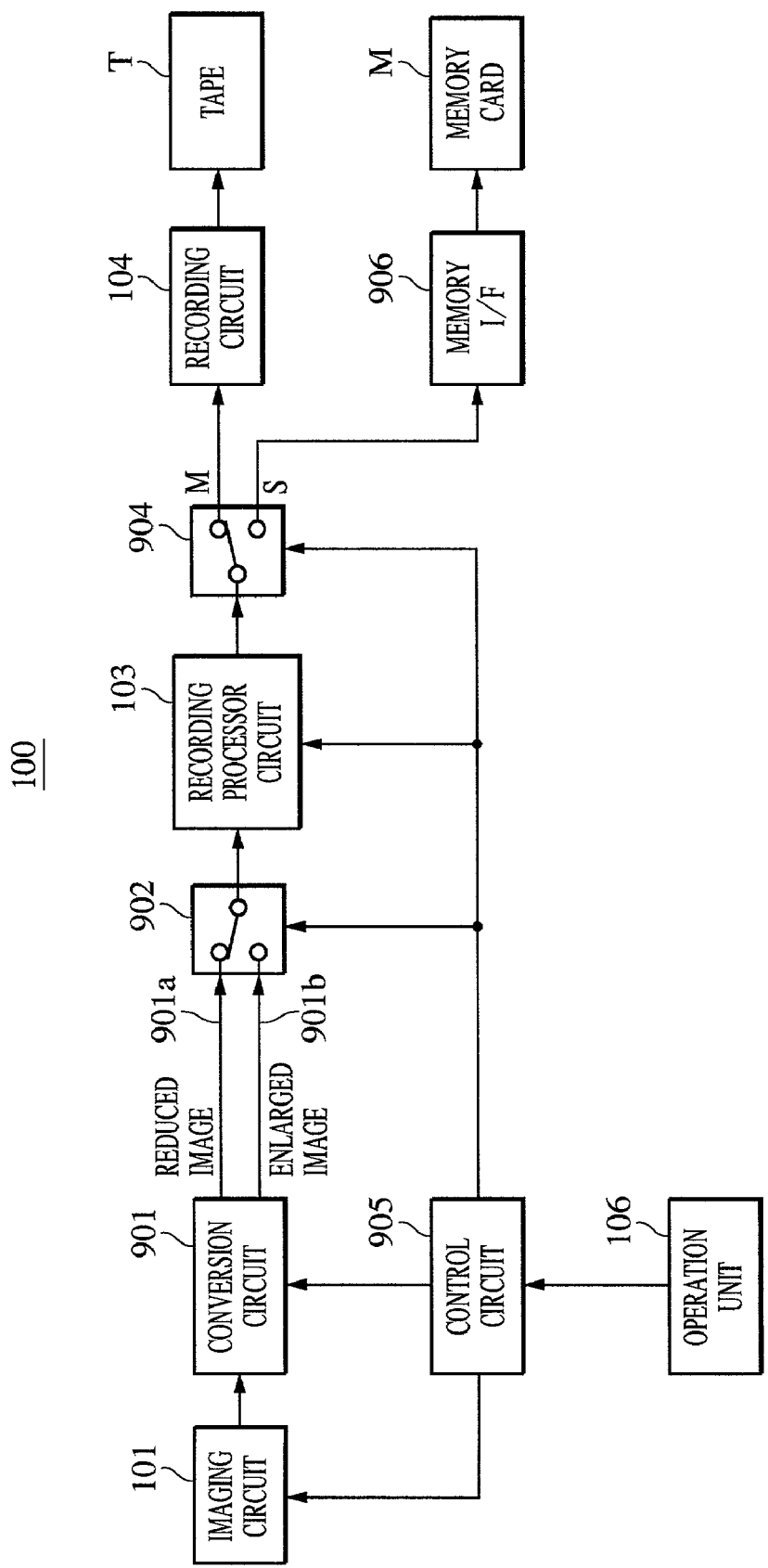
FIG. 9 is a block diagram showing a camcorder according to a second embodiment of the present invention.

Next, a camcorder according to a second embodiment of the present invention is described below with reference to FIG. 9. In FIG. 9, blocks identical to those shown in FIG. 1 are denoted by identical reference numerals. The camcorder in FIG. 9 differs from the camcorder in FIG. 1 in that an image signal processed for enlargement by an arbitrary magnification and an image signal processed for reduction by a fixed factor can be selectively output, and in that a still picture signal can be recorded in a memory card M.

The operation of the camcorder according to the second embodiment is described below by mainly referring to differences from the camcorder in FIG. 1.

In FIG. 9, an image signal from an imaging circuit 101 is output to a conversion circuit 901. The conversion circuit 901 generates an image signal corresponding to a predetermined number of pixels by performing, in accordance with a control signal from a control circuit 903, enlargement processing and reduction processing on the image signal from the imaging circuit 101. The generated image signal is output to a switch 902.

Figure 10:
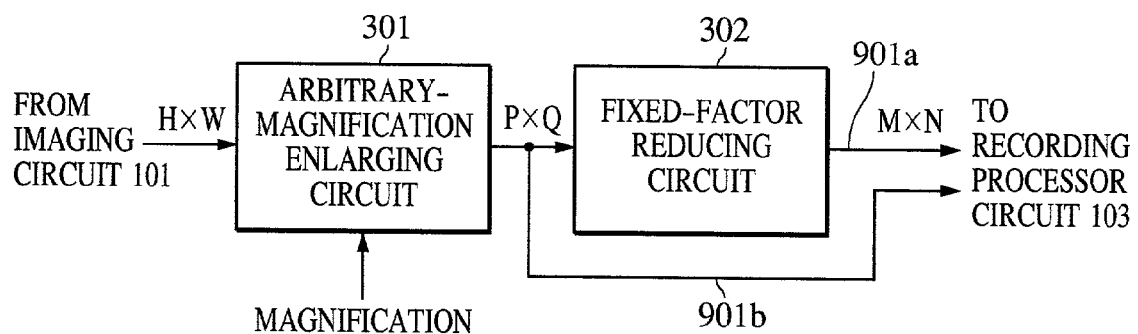
FIG. 10 is a block diagram showing a conversion circuit shown in FIG. 9.

An operation unit 106 has recording, termination, main power, and zoom switches. The user of the camcorder uses these switches to issue instructions. In accordance with a zoom instruction from the operation unit 106, a control circuit 905 outputs, to the imaging circuit 101, a control signal for instructing a zoom magnification, and outputs, to the conversion circuit 901, a control signal for instructing a magnification. FIG. 10 shows the structure of the conversion circuit 901.

The conversion circuit 901 in FIG. 10 includes an arbitrary-magnification enlarging circuit 301 and a fixed-factor reducing circuit 302, similarly to the conversion circuit 102 in FIG. 3. The conversion circuit 901 generates an image signal corresponding to a fixed size of P pixels by Q pixels by using the arbitrary-magnification enlarging circuit 301 to perform enlargement processing on the image signal from the imaging circuit 101, which has an arbitrary size of H pixels by W pixels. The P-by-Q-pixel image signal is processed for reduction by a fixed factor, whereby an image signal corresponding to a predetermined size of M pixels by N pixels is generated.

In addition, the second embodiment is designed so that the image signal output from the arbitrary-magnification enlarging circuit 301 can be output to the recording processor circuit 103 without being processed for reduction by the fixed-factor reducing circuit 302. An image signal 901a corresponding to an image having a number of M pixels by N pixels from the fixed-factor reducing circuit 302, and an image signal 901b corresponding to an image having a number of P pixels by Q pixels which is output from the arbitrary-magnification enlarging circuit 301 are output to the switch 901 in FIG. 9.

The camcorder according to the second embodiment has two recording modes: a moving picture capture mode and a still picture capture mode. The recording modes can be switched for recording a moving picture on a magnetic tape T and for recording a still picture in the memory card M.

The user uses the operation unit 106 to set one of the recording modes. The control circuit 905 controls the switch 902 to select an image signal 901a (processed for reduction) corresponding to the size of M pixels by N pixels when the set recording mode is the moving picture capture mode and to select an image signal 901b (processed for reduction) corresponding to the size of P pixels and Q pixels when the set recording mode is the still picture capture mode.

In the moving picture capture mode, the image signal 901a (processed for reduction) output from the switch 902 is processed in the recording processor circuit 103 by performing compression-encoding processing and another type of processing as described above, which are adapted for a moving picture signal. The obtained signal is output to a switch 904. In the still picture capture mode, the image signal 901b from the conversion circuit 901, which corresponds to an enlarged image of one frame, is processed in the recording processor circuit 103 by performing compression-encoding processing different from that in the moving picture capture mode. The obtained signal is output to the switch 904.

The control circuit 905 controls the switch 904 in accordance with the set recording mode. When the set recording mode is moving picture capture mode, the control circuit 905 controls the switch 904 to establish connection to an M terminal so that the moving picture signal output from the recording processor circuit 103 is supplied to a recording circuit 104. In the recording circuit 104, the moving picture signal from the switch 904 is converted into a form adapted for recording, and is recorded on the magnetic tape T.

When the set recording mode is the still picture capture mode, the control circuit 905 controls the switch 904 to establish connection to an S terminal so that the 1-frame still picture signal is supplied to a memory interface (I/F) 906. In the memory I/F 906, the 1-frame still picture signal from the switch 904 is converted into a form adapted for recording to the memory card M, and is recorded to the memory card M.

As described above, according to the second embodiment, in the moving picture capture mode, the moving picture signal output from the imaging circuit 101 is processed for arbitrary magnification enlargement in accordance with a zoom magnification, and is subsequently processed for reduction by a fixed factor so that the obtained signal is recorded on the tape T. In the still picture capture mode, a signal, obtained by processing the still picture signal output from the imaging circuit 101 for arbitrary magnification enlargement in accordance with a zoom magnification, is recorded to the memory card M without being processed for reduction by a fixed factor.

Therefore, in addition to a moving picture signal, a high-definition still picture signal can be recorded. Also in the still picture capture mode, the electronic zoom function can be used without increasing the circuit size.

Figure 11:
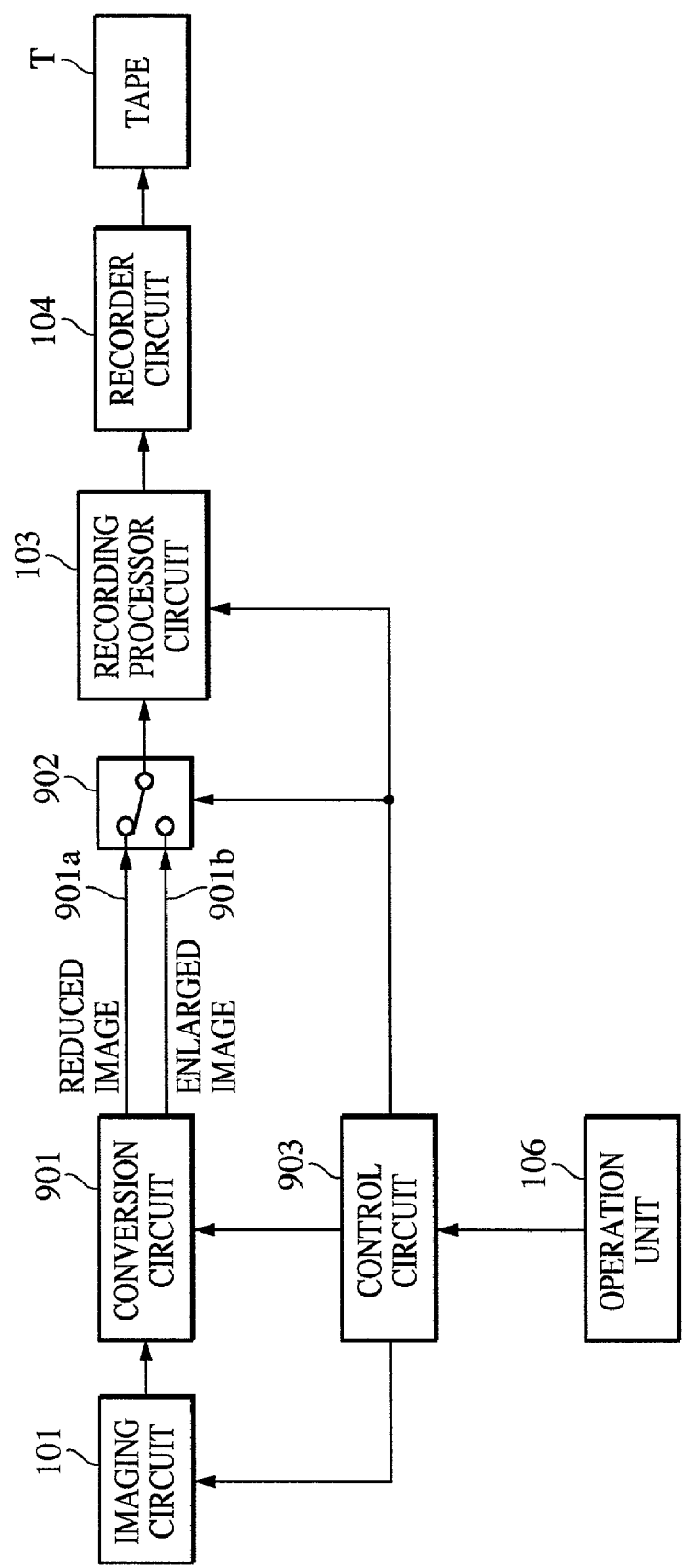
FIG. 11 is a block diagram showing a camcorder according to a third embodiment of the present invention.

Next, a camcorder according to a third embodiment of the present invention is described below with reference to FIG. 11. In FIG. 11, blocks identical to those in FIG. 9 are denoted by identical reference numerals.

In FIG. 11, an image signal obtained by an imaging circuit 101 is output to a conversion circuit 901. Also in the third embodiment, the imaging circuit 101 determines a size on the output image signal in accordance with a zoom magnification from a control circuit 903. In accordance with a control signal from the control circuit 903, the conversion circuit 901 performs arbitrary-magnification enlargement processing and fixed-factor reduction processing on the image signal from the imaging circuit 901, which corresponds to an arbitrary size of H pixels by W pixels. As a result, a reduced image signal 901a and an enlarged image signal 901b are output to a switch 902. The structure of the conversion circuit 901 is identical to that of the conversion circuit 901 shown in FIG. 10.

An operation unit 106 has recording, termination, main power, and zoom switches. The user of the camcorder uses these switches to issue instructions. In accordance with a zoom instruction from the operation unit 106, a control circuit 903 outputs, to the imaging circuit 101, a control signal for instructing a zoom magnification, and outputs, to the conversion circuit 901, a control signal for instructing a magnification. The control circuit 903 also outputs, to the switch 902, a control signal for instructing selection on an image to be recorded.

The camcorder according to the third embodiment has a high resolution image-capture mode and a standard resolution image-capture mode. The user can set one of these image-capture modes by using the operation unit 106.

When the standard resolution image-capture mode is set by the user, the control circuit 903 controls the switch 902 to selectively output, to a recording processor circuit 103, the reduced image signal 901a, which corresponds to the M-by-N-pixel size identical to the size on the image signal in the first embodiment. The recording processor circuit 103 performs, based on image-capture-mode information from the control circuit 903, a standard-resolution image signal output from the switch 902. The processed signal is output to a recorder circuit 104. The recorder circuit 104 records the processed signal on a tape T.

When the high resolution image-capture mode is set by the user, the control circuit 903 controls the switch 902 to selectively output the enlarged image signal 901b corresponding to the P-by-Q-pixel size. Based on the image-capture-mode information from the control circuit 903, the recording processing circuit 103 performs compression-encoding processing (adapted for the high resolution image-capture mode) on a high resolution image signal output from the switch 902. The processed image signal is output to the recorder circuit 104. The recorder circuit 104 records the processed image signal on the tape T.

As described above, according to the third embodiment, after performing arbitrary-magnification enlargement processing on the image signal from the imaging circuit 101 which corresponds to the size according to the zoom magnification so that an image signal corresponding to a predetermined size is generated, in accordance with the set image-capture mode, by selectively recording one of a reduced image signal generated by performing fixed-factor reduction and an enlarged image signal generated by performing only arbitrary-magnification enlargement, not only an image signal corresponding to a normal resolution, but also an image signal corresponding to a higher resolution can be recorded.

In each image-capture mode, the electronic zoom function is easily realized without increasing the circuit size.

Figure 12:
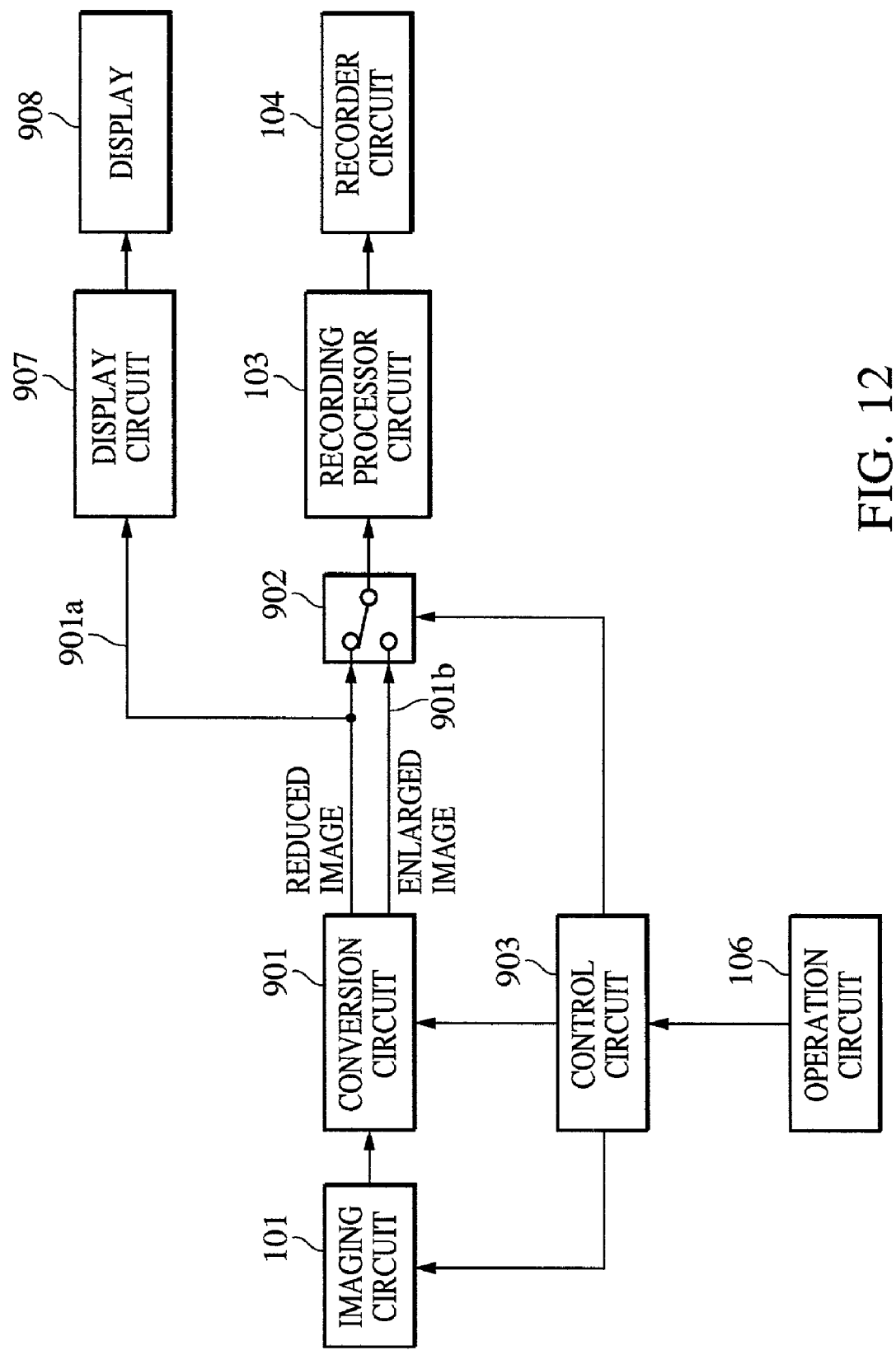
FIG. 12 is a block diagram showing a camcorder according to a fourth embodiment of the present invention.

Next, a camcorder according to a fourth embodiment of the present invention is described below with reference to FIG. 12. Blocks identical to those shown in FIG. 11 are denoted by identical reference numerals.

The camcorder according to the fourth embodiment differs from the third embodiment shown in FIG. 11 in that a display circuit 907 and a display 908 such as a liquid crystal panel or an electric view finder (EVF) are provided. In the fourth embodiment, a conversion circuit 901 supplies a reduced image signal 901a to the display circuit 907, whereby an image of a subject captured by an imaging circuit 101 is displayed on the display 908.

The liquid crystal panel or the EVF can display a predetermined-resolution picture signal (low-resolution picture signal in general). Accordingly, in the fourth embodiment, by supplying the display circuit 907 with the reduced image signal 901a (output from the conversion circuit 901) which corresponds to the M-by-N-pixel size as the standard resolution size, an image signal based on the image of the subject, which is being captured by the imaging circuit 101, can be displayed on the display 908.

As described above, according to the fourth embodiment, for recording an image signal selected from among a standard-resolution image signal obtained by performing arbitrary-magnification enlargement processing on an image signal from the imaging circuit 101, and subsequently performing fixed-factor reduction processing on the processed signal, and a high-resolution image signal obtained by performing arbitrary-magnification enlargement processing, the standard-resolution image signal which is constantly output from the conversion circuit 901 is output to the display circuit 907 so that the corresponding image is displayed on the display 908 irrespective of the set image-capture mode, whereby an image based on an image signal generated by the imaging circuit 101 can be displayed on the display 908.

In addition, not only the reduced image signal corresponding to the standard resolution, but also the enlarged image signal corresponding to the high resolution can be supplied to the display circuit 907.

Figure 13:
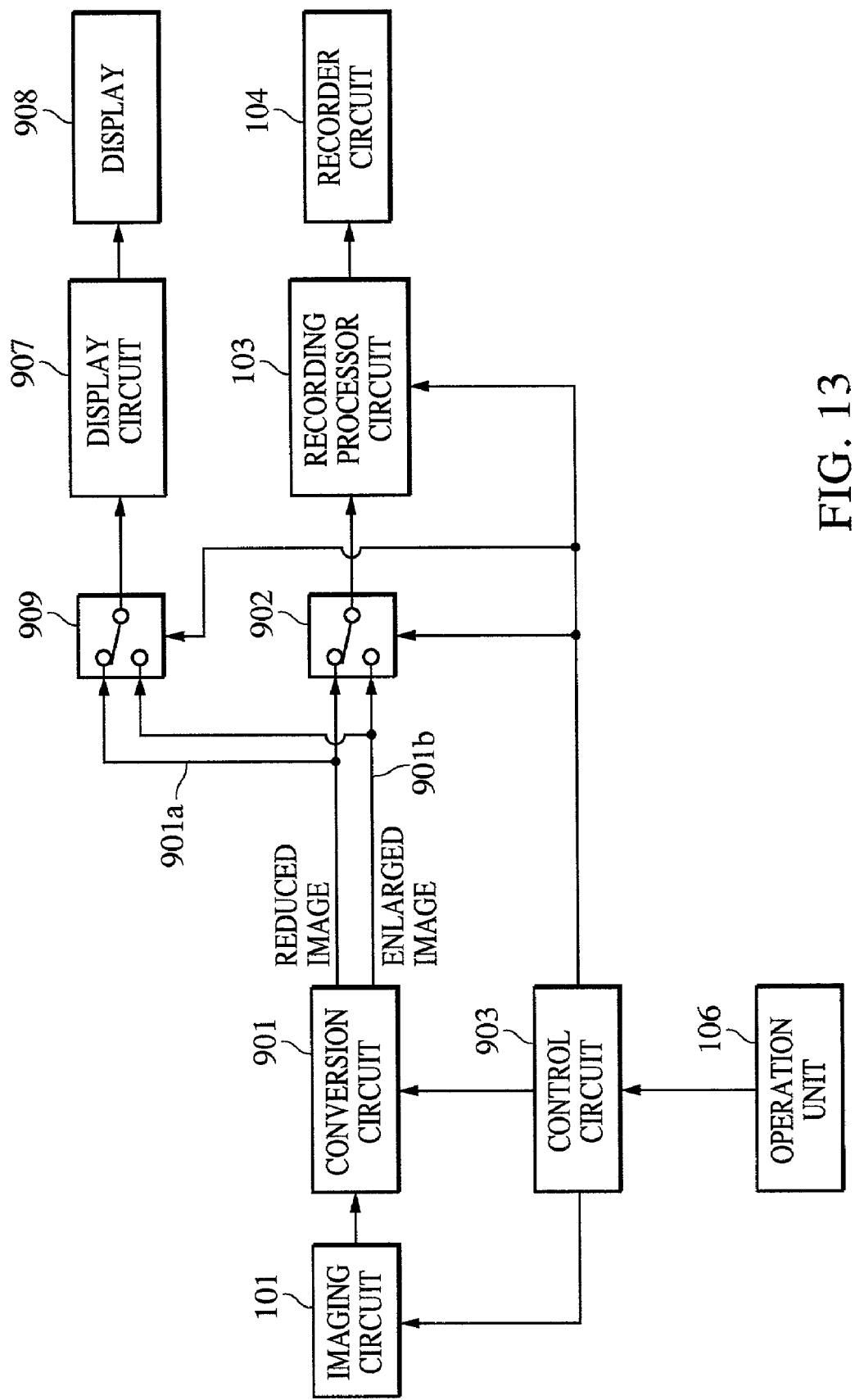
FIG. 13 is a block diagram showing a camcorder according to a further embodiment of the present invention.

FIG. 13 shows a camcorder according to a further embodiment of the present invention. This camcorder differs from that shown in FIG. 12 in that, by adding a switch 909, one of a reduced image signal 901a and an enlarged image signal 901b is selectively supplied to a display circuit 907 in accordance with an image-capture mode set by the user or a display-switching instruction from the user. According to the construction shown in FIG. 13, one of an enlarged image and a reduced image is selectively displayed on the display 908, irrespective of the set image-capture mode. For example, this construction is very effective in that, when an image obtained in the high-resolution image-capture mode is previewed, or image monitoring is performed, the enlarged image signal 901b can be selected and displayed on the display 908.

In the foregoing embodiments, cases in which the present invention is applied to camcorders have been described. However, the present invention can also be applied, for example, to an imaging apparatus that outputs a captured image to an external display unit, and to processing in which image signals corresponding to various image sizes other than an image signal from an imaging device are converted into predetermined sizes. In these forms to which the present invention is applied, advantages similar to those in the foregoing embodiments are obtained.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:
   an imaging unit which generates, by capturing an image of a subject, an image signal corresponding to an image having an arbitrary number of H pixels by W pixels which is not greater than a predetermined number of P pixels by Q pixels in vertical and horizontal directions;
   an enlarging unit which generates an enlarged image signal corresponding to an enlarged image having the number of P pixels by Q pixels by performing enlargement processing on the image signal having the number of H pixels by W pixels generated by said imaging means;
   a reducing unit which generates a reduced image signal corresponding to a reduced image having a predetermined number of M pixels by N pixels which is not greater than the predetermined number of P pixels by Q pixels in vertical and horizontal directions by performing reduction processing on the enlarged image signal corresponding to the enlarged image having the number of pixels by Q pixels; and
   a recording unit for recording the image signal outputted by said reducing means on a recording medium, wherein the enlarged image signal is inhibited from the being recorded on the recording medium.

2. An imaging apparatus according to claim 1, wherein said enlarging unit sets a magnification used in to enlargement processing on the image signal generated by said imaging unit in accordance with the number of H pixels by W pixels.

3. An imaging apparatus according to claim 1, wherein said reducing unit generates said reduced image signal corresponding to the reduced image having the number of M pixels by N pixels by performing the reduction processing on the enlarged image signal by using a fixed factor.

4. An imaging apparatus according to claim 1, wherein said enlarging unit performs to enlargement processing by using linear interpolation.

5. An imaging apparatus according to claim 1, wherein said enlarging unit performs the enlargement processing by using cubic convolutional interpolation.

6. An imaging apparatus according to claim 1, wherein said imaging unit includes an imaging device having the number of P pixels by Q pixels, and generates the image signal corresponding to the image having the number of H pixels by W pixels by using part of an area of said imaging device.

7. An imaging apparatus comprising:
   imaging means for generating an image signal corresponding to an arbitrary image size equal to or smaller than a first predetermined image size, the generated image signal being converted into an image signal corresponding to a second predetermined image size smaller than the first predetermined image size by said imaging apparatus;
   enlarging means for performing enlargement processing on said image signal generated by said imaging means to generate an image signal corresponding to said first predetermined image size;
   reducing means for performing reduction processing on said image signal generated by said enlarging means to generate an image signal corresponding to said second predetermined image size, wherein said second predetermined image size has smaller resolutions than resolutions of said first predetermined image size; and recording means for recording the image signal corresponding to said second predetermined image size generated by said reducing means on a recording medium, wherein said image signal generated by said enlarging means is inhibited from being recorded on the recording medium.

8. An imaging apparatus according to claim 7, wherein:

said enlarging means performs the enlargement processing on said image signal generated by said imaging means by using a magnification in accordance with the arbitrary size on said image signal generated by said imaging means; and said reducing means performs the reduction processing on said image signal generated by said enlarging means by using a fixed factor.

9. An imaging apparatus comprising:

imaging means having an electronic zoom function;

enlarging means for performing enlargement processing on an image signal generated by said imaging means by using a variable magnification in accordance with a magnification used in said electronic zoom function;

reducing means for performing reduction processing on the image signal processed by said enlarging means by using a fixed factor to reduce vertical and horizontal resolutions of the processed image signal; and recording means for recording the image signal corresponding to a second predetermined image size generated by said reducing means on a recording medium, wherein the image signal processed by said enlarging means is inhibited from being recorded on the recording medium.

10. An imaging apparatus according to claim 9, wherein:

said enlarging means generates an image signal corresponding to a first predetermined size by performing enlargement processing on said image signal generated by said imaging means; and said reducing means generates an image signal corresponding to a second predetermined size by performing reduction processing on the generated image signal corresponding to said first predetermined size.

11. An imaging apparatus comprising:

imaging means for generating, by capturing an image of a subject, an image signal corresponding to an image having an arbitrary number of H pixels by W pixels which is not greater than a predetermined number of P pixels by Q pixels in vertical and horizontal directions;

enlarging means for generating an enlarged image signal corresponding to an enlarged image having the number of P pixels by Q pixels by performing cubic convolutional interpolation processing on the image signal having the number of H pixels by W pixels generated by said imaging means;

reducing means for generating a reduced image signal corresponding to a reduced image having a predetermined number of M pixels by N pixels which is not greater than the predetermined number of P pixels by Q pixels in vertical and horizontal directions by performing finite-impulse-response filtering on the enlarged image signal corresponding to the enlarged image having the number of P pixels by Q pixels; and recording means for recording the image signal outputted by said reducing means on a recording medium, wherein the enlarged image signal is inhibited from being recorded on the recording medium.

12. An imaging apparatus comprising:

imaging means for generating, by capturing an image of a subject, an image signal corresponding to an image having an arbitrary number of H pixels by W pixels which is not greater than a predetermined number of P pixels by Q pixels in vertical and horizontal directions;

enlarging means for generating an enlarged image signal by performing linear-interpolation processing on the image signal having the number of H pixels by W pixels generated by said imaging means;

reducing means for generating a reduced image signal corresponding to a reduced image having a predetermined number of M pixels by N pixels which is not greater than the predetermined number of P pixels by Q pixels in vertical and horizontal directions by performing finite-impulse-response filtering on the enlarged image signal corresponding to the enlarged image having the number of P pixels by Q pixels; and recording means for recording the image signal outputted by said reducing means on a recording medium, wherein the enlarged image signal is inhibited from being recorded on the recording medium.

13. A method for generating an image signal corresponding to an image having a predetermined number of M pixels by N pixels by converting an input image signal corresponding to an image having an arbitrary number of H pixels by W pixels which is less than a predetermined number of P pixels by Q pixels in vertical and horizontal directions, said method comprising the steps of:

generating an enlarged image signal corresponding to an enlarged image having the number of P pixels by Q pixels by performing enlargement processing on the input image signal corresponding to the image having said arbitrary number of H pixels by W pixels;

generating the image signal corresponding to the image having the number of M pixels by N pixels which is not greater than the predetermined number of P pixels by Q pixels in vertical and horizontal directions by performing reduction processing on the generated enlarged image signal corresponding to the image having the number of P pixels by Q pixels; and recording the image signal outputted by said reducing means on a recording medium, wherein the enlarged image signal is inhibited from being recorded on the recording medium.

14. A method for converting an input image signal from an imaging device which corresponds to an arbitrary image size equal to or less than a first predetermined image size into an image signal corresponding to a second predetermined image size smaller than the first predetermined image size, said method comprising the steps of:

generating an enlarged image signal corresponding to an enlarged image having said first predetermined image size by performing enlargement processing on said input image signal to generate an image signal corresponding to the arbitrary image size;

performing reduction processing on the generated image signal so as to generate the image signal corresponding to said second image size; and recording the image signal corresponding to said second predetermined image size generated by said reduction process on a recording medium, wherein said image signal generated in the generating step is inhibited from being recorded on the recording medium.

15. A computer-readable storage medium storing a program for controlling a computer to execute a process for generating an image signal corresponding to an image having a predetermined number of M pixels by N pixels by converting an input image signal corresponding to an image having a predetermined number of H pixels by W pixels which is not greater than a predetermined number of P pixels by Q pixels in vertical and horizontal directions, said process comprising the steps of:

generating an enlarged image signal corresponding to an enlarged image having the number of P pixels by Q pixels by performing enlargement processing on said input image signal corresponding to the image having said arbitrary number of H pixels by W pixels;

generating said image signal corresponding to the image having the number of M pixels by N pixels which is not greater than the predetermined number of P pixels by Q pixels in vertical and horizontal directions by performing reduction processing on the generated enlarged image signal corresponding to the image having the number of P pixels by Q pixels; and recording the image signal outputted by said reducing means on a recording medium, wherein the enlarged image signal is inhibited from being recorded on the recording medium.

16. A computer-readable storage medium storing a program for controlling a computer to execute a process for converting an input image signal from an imaging device which corresponds to an arbitrary image size equal to or less than a first predetermined image size into an image signal corresponding to a second predetermined image size smaller than the first predetermined image size, said process comprising the steps of:

generating an enlarged image signal corresponding to an enlarged image having said first predetermined image size by performing enlargement processing on said input image signal corresponding to the arbitrary image size;

performing reduction processing on the generated image signal so that the image signal corresponding to said second image size is generated; and recording the image signal corresponding to said second predetermined image size generated by said reduction process on a recording medium, wherein said image signal generated by said enlarging means is inhibited from being recorded on the recording medium.

17. A computer-readable storage medium storing a program for controlling a computer to execute a process for generating an interlaced image signal from an imaging device corresponding to an interlaced image having a predetermined number of M pixels in the vertical direction by converting an input interlaced image signal corresponding to an interlaced image having an arbitrary number of H pixels which is not greater than a predetermined number of P pixels in the vertical direction of one field, said process comprising:

an enlarging step for generating a progressive image signal corresponding to a progressive image having the number of P pixels in the vertical direction by performing enlargement processing on said input interlaced image signal, corresponding to the image having an arbitrary number of H pixels by W pixels, in units of fields;

a reducing step for generating an interlaced image signal corresponding to an interlaced image having the number of M pixels by performing reduction processing on the generated progressive image signal in units of frames; and a recording step for recording the image signal corresponding to the image having an number of M pixels by N pixels generated in said reduction step on a recording medium.

* * * * *

UNITED STATES PATENT AND TRADEMARK OFFICE
CERTIFICATE OF CORRECTION

PATENT NO. : 7,142,237 B2  Page 1 of 1
APPLICATION NO. : 09/874253
DATED : November 28, 2006
INVENTOR(S) : Nozawa It is certified that error appears in the above-identified patent and that said Letters Patent is hereby corrected as shown below:

COLUMN 6:
Line 52, "drawings" should read -- drawings. --.

COLUMN 9:
Line 25, "image 10," should read -- image --.

COLUMN 14:
Line 25, "of" should read --of P --;
Line 28, "from the" should read -- from --;
Line 31, "to" should read -- the --; and
Line 41, "to" should read -- the --.

COLUMN 16:
Line 59, "second image size; and" should read -- second predetermined image size, wherein said second predetermined image size has smaller resolutions than resolutions of said first predetermined image size; and --.

COLUMN 18:
Line 3, "second image size is generated; and" should read -- second predetermined image size is generated, wherein said second predetermined image size has smaller resolutions than resolutions of said first predetermined image size; and --;
Line 32, "an" should read --a --.

Signed and Sealed this

Eighteenth Day of September, 2007

JON W. DUDAS
*Director of the United States Patent and Trademark Office*